Figure 1:
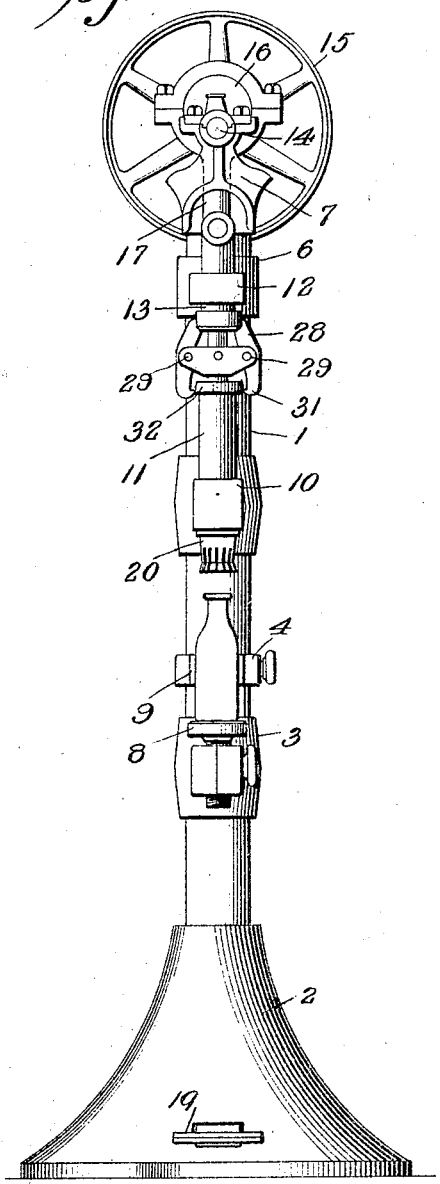

J. A. McANULTY.
BOTTLE CAPPING MACHINE.
APPLICATION FILED NOV. 21, 1907.

917,344.

Patented Apr. 6, 1909.
4 SHEETS—SHEET 1.

Witnesses
Jos. F. Collins.
J. M. Wynkoop.

Inventor
John Armstrong McAnulty,
By Knight Bros
Attorneys

J. A. McANULTY.
BOTTLE CAPPING MACHINE.
APPLICATION FILED NOV. 21, 1907.

917,344.

Patented Apr. 6, 1909.
4 SHEETS—SHEET 2.

Witnesses
Jos F Collins
J. M. Wynkoop

Inventor
John Armstrong McAnulty
By Knight Bros
Attorneys

J. A. McANULTY.
BOTTLE CAPPING MACHINE.
APPLICATION FILED NOV. 21, 1907.

917,344.

Patented Apr. 6, 1909.
4 SHEETS—SHEET 3.

Witnesses
Jos. F. Collins
J. M. Wynkoop

Inventor
John Armstrong McAnulty,
By Knight Bros
Attorneys

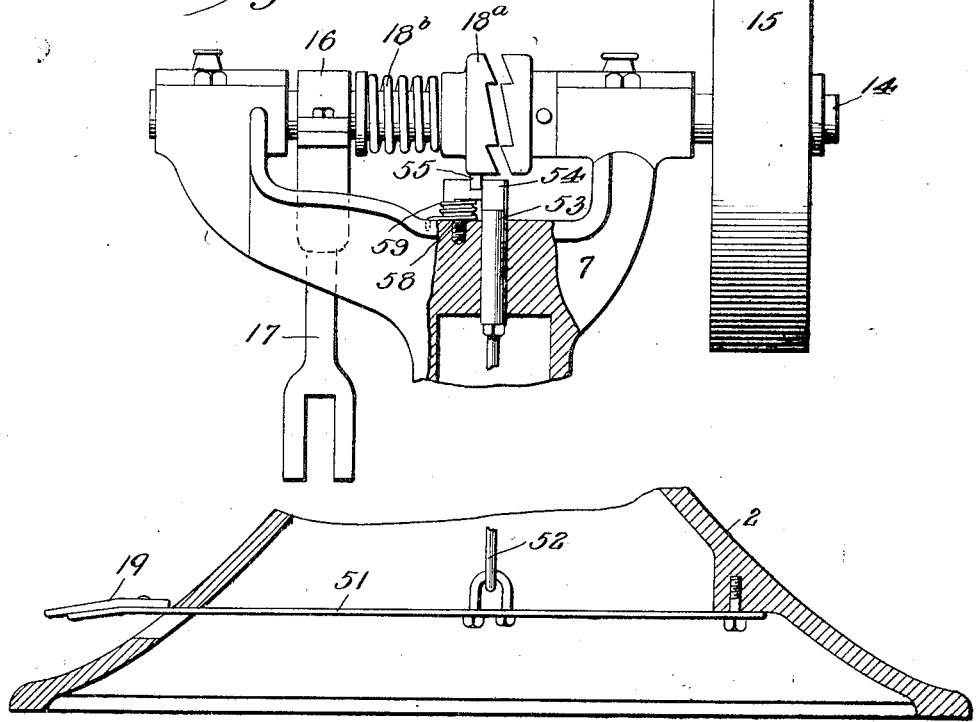
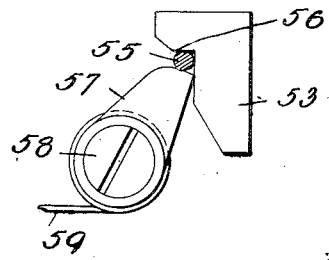
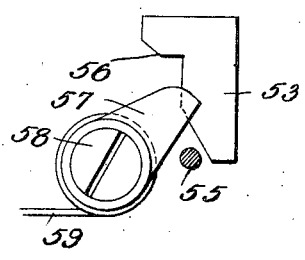
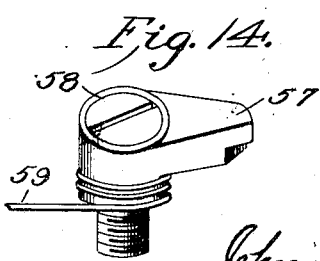

UNITED STATES PATENT OFFICE.

JOHN ARMSTRONG McANULTY, OF BALTIMORE, MARYLAND.

BOTTLE-CAPPING MACHINE.

No. 917,344.  Specification of Letters Patent.  Patented April 6, 1909.

Application filed November 21, 1907. Serial No. 403,199.

*To all whom it may concern:*

Be it known that I, JOHN ARMSTRONG MCANULTY, a citizen of the United States, and a resident of the city of Baltimore, in the State of Maryland, have invented certain new and useful Improvements in Bottle-Capping Machines, of which the following is a specification.

My invention relates to means for applying closing and sealing caps to bottles, by compressing the flange of the cap into gripping relation to the head of the bottle.

Heretofore it has been proposed to secure to a bottle head, a cap provided with a compressible packing disk and a coarsely corrugated flange, by forcing a die (usually rigid) down over the corrugated flange of the cap in such manner that, by contact with the outwardly presented relatively large ridges, those inwardly presented were forced into such gripping relation beneath the lip or other prominent portion of the bottle head, as to draw the packing downward into sealing relation to the mouth of the bottle. In this form of closure, a top packing which is alone relied upon to hermetically close the receptacle, is necessarily made of a thick and expensive material such as cork, and the best results obtainable with this system are accompanied by a considerable percentage of defective work and breakage.

One object of my invention is to reduce the breakage in sealing bottles which is liable to occur in consequence of irregularities in the dimensions of the bottles, to which end my invention consists in applying the pressure through the medium of a spring which can be adjusted to any desired initial load so that the movement of the plunger will develop no more than the pressure necessary to seal the bottle, and interposing in the plunger, automatic means releasing the driving connection as soon as the desired pressure is developed.

Another object of my invention is to secure more perfect sealing and more nearly uniform treatment of the entire cap flange, notwithstanding the irregularities in the circumference of the bottle head, and also to develop more complete compression in the flange, to which end my invention consists in providing a sealing device comprising a reducing member and a cap-compressing or forming means hereinafter referred to as the forming means; the latter being divided into upper and lower sections, having compressing faces conforming to the shape of the bottle at points over which they press, one of which impinges the base and, preferably, a portion of the side of the cap while the other impinges the remaining part of the flange of the cap below the base, said sections being each divided into segments which adapt them to conform to irregularities in the head of the bottle and to distribute the sealing pressure uniformly throughout the circumference of the cap, notwithstanding such irregularities; and the reducing member being divided by a number of radial slots into a circumferential series of integral but resilient pressure fingers which so impinge the forming means as to insure imparting the proper degree of sealing pressure to each segment of the forming means, notwithstanding irregularities in the head of the bottle; the relations of the two sections of the forming means to each other and of the forming means to the reducing member being such that the resistance of the bottle to the downward movement of the inner and upper segmental forming section causes the outer segmental forming section to close around the flange, after which the downward movement of the reducing member forces all the segments of both sections of the forming member inward to perform the sealing, and when the reducing member again rises, the sections of the forming means are automatically opened to release the cap.

Another object of my invention is to provide means whereby the sealing stroke of the machine is automatically repeated, so as to deliver two successive strokes each time the machine is released by operation of the clutch treadle, the bottle being slightly rotated between these two strokes in order that the forming means may treat every circumferential point in the cap alike, and avoid leaks at points in the cap corresponding to the dividing planes of the segments of the forming means.

To this end my invention consists in providing a spring-pressed dog which automatically assumes a position above the arresting stop each time the latter is depressed to release the clutch pin, which dog however, is engaged by the clutch pin during its first revolution and displaced to permit return of the arresting stop, such displacement, however, being accomplished only after the clutch pin has passed the point at which it can be arrested by the stop, so that it will complete another revolution before the clutch is thrown out and the working stroke of the machine interrupted.

Figure 2:
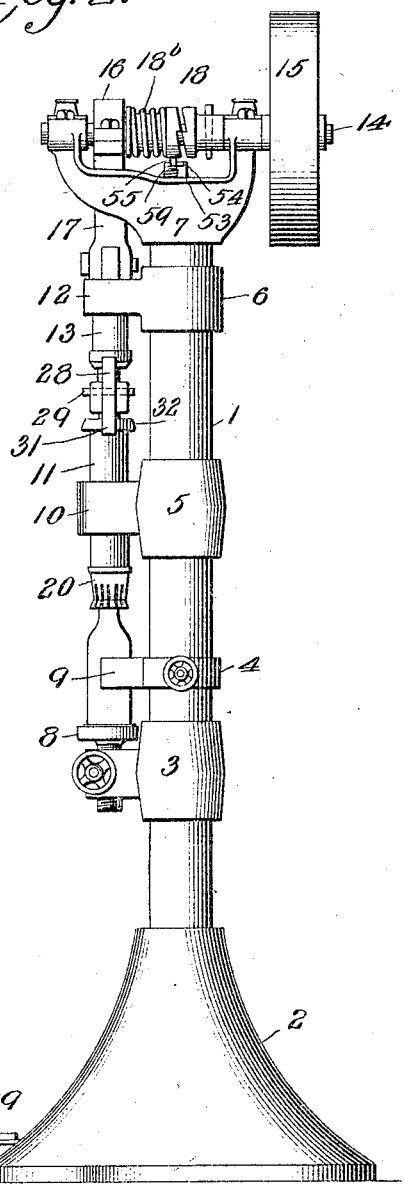
Figure 3:
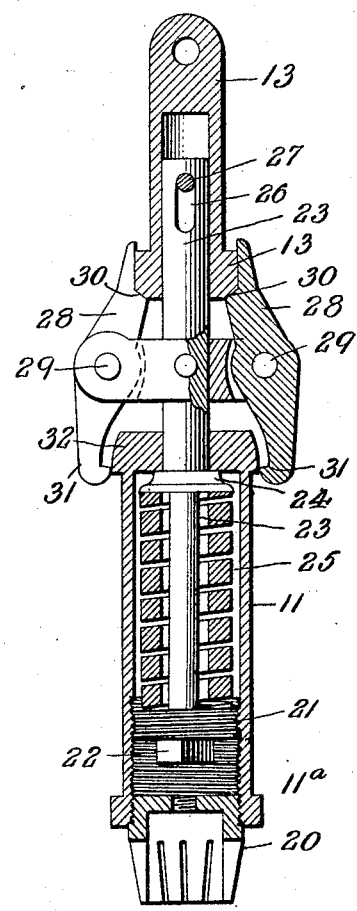
Figure 4:
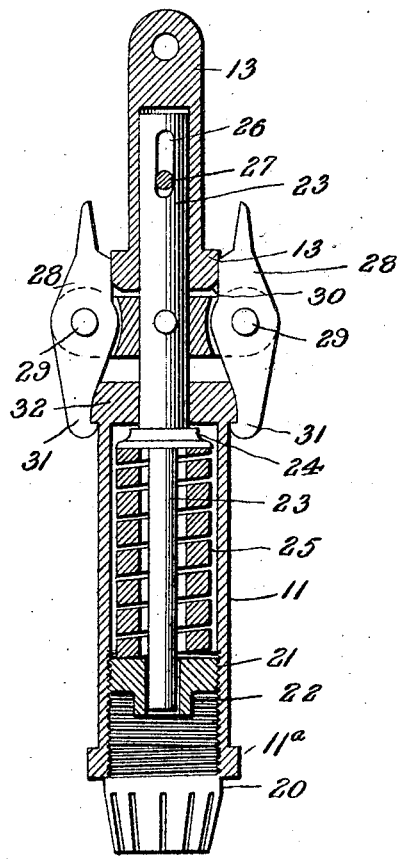
Figure 5:
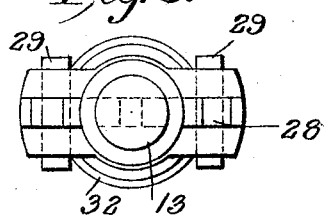
Figure 6:
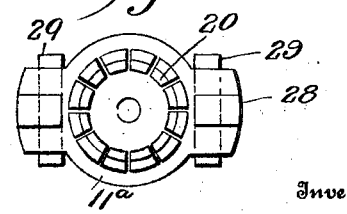
Figure 7:
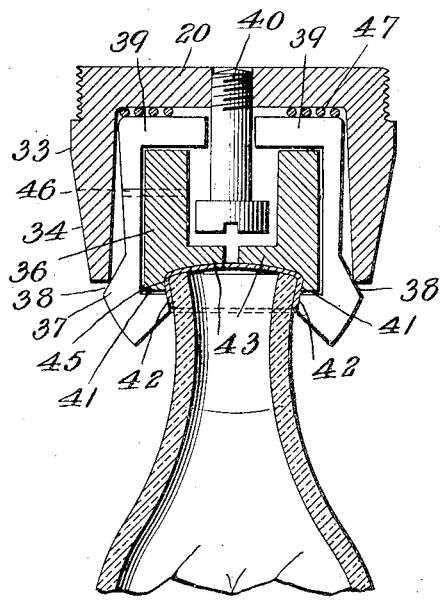
Figure 8:
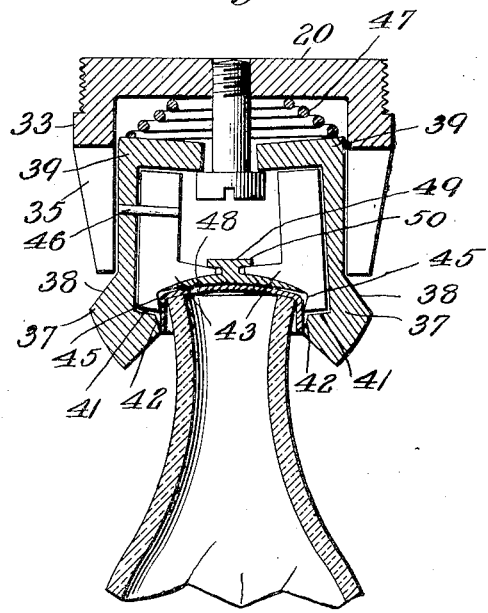
Figure 9:
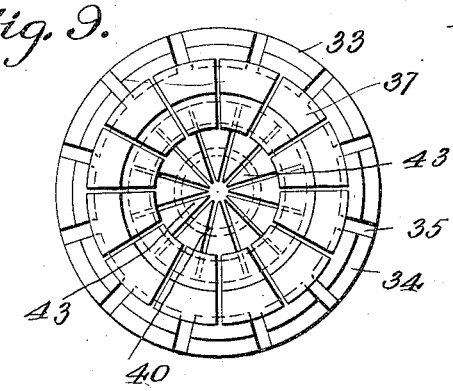
Figure 10:
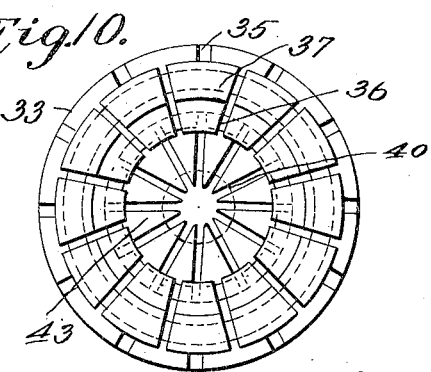

In addition to the features carrying out the functions above enumerated, my invention further consists in details of construction, as well as combinations and relations of parts incident to the preferred embodiments of the several features, all of which will be fully understood upon reference to the accompanying drawings, in which, Figures 1 and 2 are elevations of a complete sealing machine embodying the several features of my invention, seen in two positions at right angles to each other. Figs. 3 and 4 are sectional views of the spring plunger and lost motion device through which the pressure imposed upon the bottle through the sealing device is weighed notwithstanding variations in the length of the bottle; Fig. 3 showing the position assumed by the parts when the pressure is applied and Fig. 4 showing the positions assumed by the parts after the pressure has been applied to the bottle. Figs. 5 and 6 are respectively a top and a bottom plan view of the parts shown in Figs. 3 and 4. Figs. 7 and 8 are axial sections through the sealing device, the former being taken in one of the dividing planes of the forming means and the latter being taken in one of the dividing planes of the reducing member; said views showing the positions of the parts when the sealing pressure is on the bottle and when the bottle is released, respectively. Figs. 9 and 10 are bottom plan views showing the parts and positions thereof shown in Figs. 7 and 8, respectively. Fig. 11 is a detail view showing the clutch and its controlling pedal. Figs. 12 and 13 are detail views showing the means for dogging the arresting stop of the clutch in the position to which it is depressed by the treadle, the former illustrating the positions assumed by the parts when the clutch is arrested and the latter showing the positions assumed by the parts when the arresting stop is held down. Fig. 14 is a perspective view of the dog.

Referring to Figs. 1 and 2, I prefer to employ a standard 1 provided with a suitable base 2 and with supporting or guiding brackets 3, 4, 5, 6, and 7, of which bracket 3 carries the adjustable support 8 for the bottle, the bracket 4 carries the guide 9 for said bottle, the bracket 5 provides a slide bearing 10 for the sealing plunger 11, the bracket 6 provides a slide bearing 12 for the head 13 and the bracket 7 provides bearings for the shaft 14 which may be driven by a pulley 15 and which carries the eccentric 16 transmitting reciprocating motion through pitman 17 to the head 13, and having a clutch 18 intermittently released by the treadle 19 to establish driving connection between the shaft and eccentric. These parts, broadly considered, are not of my invention and need not be more specifically described.

Referring to Figs. 3 to 6, the sealing plunger 11 carries the sealing attachment 20 at its lower end and comprises a spring barrel having a perforated head 21 screw-threaded in the lower end thereof and adapted to be rotated by its nut 22 to adjust its position therein, a vertically movable stem 23 provided with a fixed shoulder 24 and a spring 25 confined between the shoulder and the adjustable head 21. Shoulder 24 limits the upward movement of stem 23 in the barrel and the lower end of said stem is guided by the head 21. Downward pressure on the stem 23 is transmitted to the barrel 20 only through the spring 25. By adjusting the head 21 to determine the initial load on the spring 25, the degree of pressure to be imparted through the spring may be accurately pre-determined. To limit the sealing pressure applied to a bottle and adapt the plunger to impart the same pressure to bottles of different lengths, without changing the stroke of the machine, I provide means whereby the compressing stem receives only a certain limited downward movement sufficient to develop the desired degree of pressure, after contact of the sealing attachment with the bottle, after which further movement in the stroke of the machine continues without effect upon the bottle. This means comprises the head 13 in which the upper end of the stem 23 has a relative movement permitted by slot 26 through which its securing pin 27 passes, and dogs 28 pivoted at 29 upon the stem 23, constructed with shoulders 30 which receive the lower end of the head 13 and with spreading ends 31 that impinge the enlargement 32 on the spring barrel 11. The first part of the downward movement of head 13 is transmitted through the dogs 28 to the stem 23 and through the spring 25 to the barrel 11 and sealing attachment 20. As soon, however, as the spring is compressed to a degree which permits the spreading ends 31 to pass beneath the enlargement 32, the head 13 is released from the shoulders 30, and further downward movement of head 13 to the limit of the stroke of the machine may take place without imparting further compression to the spring and since rod 23 is now free to slide in head 13, without longer exerting pressure upon the sealing member. The spring barrel 11 with the sealing attachment will be raised with the head 13, through friction of the parts and until the spring barrel 11 is arrested by contact of its shoulder 11$^a$ with the bearing 10, when the barrel will be held while head 13 continues to a point above the shoulders 30, at which time the spreading ends 31 will be displaced from the enlargement 32 under the action of the spring 25, the position of the pivots 29 relatively to the enlargement 32 being such as to cause the spreading ends 31 to draw away. The parts will then have the positions shown in Figs. 1 and 3. By shifting the spring seat 21 in the barrel 11 the initial load on the spring may be varied and therefore the sealing pressure resulting from this initial pressure plus the additional pressure due to the relative movement of the rod in the barrel may be pre-determined at will.

The sealing or capping attachment 20 comprises a reducing member 33, in the form of a downwardly presented flange 34, divided radially into a circumferential series of individually resilient fingers 35, and a forming means divided into an upper inner section 36 and an outer section 37, each of which is made up of a circumferential series of segments, the segments of the outer section 37 being constructed with the outer inclined faces 38, the upper inturned ends 39 spaced apart to receive the limiting pin 40 by which the forming means is supported within the reducing member 33; also with the lower inwardly presented supporting shoulders 41, and with the lower inwardly presented compressing face 42. When supported, as upon the head of a bottle, while the reducing member moves downward relatively thereto the outer section of the forming means will be contracted and its faces 42 will press the flange of the cap against the neck of the bottle; and being segmental, these compressing faces will conform to irregularities in the bottle. The upper and inner section of the inner forming means is confined between the shoulders or seat 41 and the ends 39, and is constructed with the lower inturned ends 43. The combined segments thus form a cap-cavity or die with base 43 and independent compressing faces 42, 45, forming the side wall of the cap-cavity or die. These compressing faces are undercut and are constructed to conform to the particular shape of the bottle head to be capped. Inward movement of the segments of the outer forming section is imparted to those of the inner forming section, and thus they coact and supplement each other. The dividing planes of the one section do not coincide with those of the other; this relation being maintained by a pin 46 passing through an outer segment and between two adjoining inner segments; that is to say, the segments break joints; hence they interlock and their combined compression is circumferentially continuous. The inner forming segments impinge a higher portion of the flange than the outer segments but inasmuch as the cap flange is longitudinally stiffened by the crimping incident to manufacture of the caps, it follows that the compressing influence of each segment extends vertically beyond the immediate area of its impingement.

47 represents a spring which may be introduced between the upper ends of the outer forming segments and the base of the reducing member 33 and when so introduced and while the segments rest upon the bolt 40, the spring tends to close the interlocking forming segments with sufficient firmness to adapt them to grip and hold the cap to be applied.

To adapt the device for different sizes of caps, a cap-plate 48 may be employed, which is removably held in place by its shank 49 passing through the base of the cap-cavity and its enlargement 50 engaging above said base, as shown in Fig. 8. A plurality of these cap-plates may be interchangeably adapted, the segmental structure permitting them to be inserted and withdrawn at will.

The forming means is supported in the reducing member with such freedom of universal adjustment that it adapts itself to any inaccuracy in the shape of the bottle head, and thus greatly reduces breakage from this cause; and this adaptability is effective as to unevenness or irregularities in the upper edge of the bottle as well as to mere deflection of the plane thereof relatively to the axis of the bottle.

For the purpose of repeating the forming stroke for delivering two forming strokes to each cap, I employ a known construction comprising a treadle 19 rigidly secured upon the outer end of a spring-bar 51 which whenever displaced by the pressure of the foot upon the treadle, returns to its normal position upon removal of the pressure. Said bar 51 is connected by a rod 52 with a stop 53 having a beveled face 54 in the path of the pin 55 on the movable clutch member 18ª so as to displace the clutch member when the pin 55 contacts with said face 54, said stop also having a shoulder 56 which arrests the pin 55, parts being so arranged that each time the treadle 19 is depressed, and the stop 53 drawn down, the clutch member 18ª will be pressed into engagement by its spring 18ᵇ and the machine will receive motion from the constantly running shaft 14 until pin 55 again contacts with the face 54. To provide for two revolutions before interruption of the clutch, I provide a dog 57 pivoted at 58 and having a spring 59 tending to throw it above the stop 53 so that each time the stop is depressed, the dog 57 engages above it and prevents its return. But dog 57 thus moves into the path of the pin 55 and on the first passage of the pin, dog 57 is displaced to the position shown in Fig. 12 and the stop 53 rises; but this does not take place until after the pin 55 has passed over the stop 53 and the displacing and arresting engagement between the pin 55 and the stop 53 does not occur until after one additional revolution of the clutch. Between the two forming strokes of the machine thus developed, the bottle may be slightly rotated so as to distribute the points of compression more uniformly around the cap of the bottle.

Having thus described my invention, what I claim as new therein and desire to secure by Letters Patent is:—

1. In a capping machine having a reciprocating pressure developing means and a sealing device actuated by pressure therefrom, a spring through which the actuating pressure is transmitted and means interrupting the transmission of movement from the pressure developing means, after a predetermined compression of the spring has taken place, said means comprising a relief mechanism mounted above the sealing device.

2. In a capping machine having a sealing device constructed to press the cap into sealing relation to the bottle and a reciprocating actuating member, a spring through which the reciprocating member actuates the sealing device by its movement in one direction, a releasing device carried by the actuating member and adapted to permit the reciprocating member to continue its movement independently of the spring after developing a predetermined compression in the latter.

3. In a capping machine having a sealing device constructed to press the cap into sealing relation to the bottle and a reciprocating actuating member, a spring through which the reciprocating member actuates the sealing device by the first part of its movement in one direction, a releasing device actuated by said reciprocating member and adapted to permit the reciprocating member to continue its movement independently of the spring after developing a predetermined compression in the latter, and means for actuating said releasing device during the first part of the actuating movement.

4. In a capping machine having a sealing device constructed to press the cap into sealing relation to the bottle and a reciprocating actuating member, a spring by means of which the reciprocating member is adapted to actuate the sealing device by a part of its movement in one direction, a dogging means through which the compressing movement is imparted to the spring, said dogging means being adapted to release the reciprocating member to permit it to continue its movement independently of the spring after developing a predetermined compression in the latter, and means for detaining the dogging means, said detaining means being released after the spring has received its compression.

5. In a capping machine, the combination of the sealing device, the spring-pressed plunger actuating the same, the reciprocating member, a relief mechanism pivotally connected with said reciprocating member, and connections through which the reciprocating member imparts movement to one end of the spring, embodying dogging means carried by one of the parts and engaging the other.

6. In a capping machine, the combination of the sealing device, the plunger by which it is actuated, the spring through which the plunger is actuated, the rod through which the spring is compressed, the reciprocating member, and automatically releasing dogs pivoted on the rod through which the reciprocating member moves the compressing rod.

7. In a capping machine, the combination of the sealing device, the plunger by which it is actuated, the spring through which the plunger is actuated, the rod through which the spring is compressed, the reciprocating member, and automatically releasing dogs pivoted on the rod through which the reciprocating member moves the rod, the carrying ends of said dogs which impinge the plunger to hold the dogs in abutting position during the first part of the movement of the reciprocating member and then escape from the plunger and release the reciprocating member.

8. In a capping machine, the combination of the sealing device, the plunger by which it is actuated, the spring through which the plunger is actuated, the rod through which the spring is compressed, the reciprocating member, and automatically releasing dogs pivoted on the rod through which the reciprocating member moves the rod, the carrying ends of said dogs which impinge the plunger to hold the dogs in abutting position during the first part of the movement of the reciprocating member and then release the reciprocating member; said reciprocating member passing between the dogs during its continued movement.

9. In a capping machine, the combination of the sealing device, the plunger by which it is carried, the spring through which sealing pressure is transmitted to the plunger, the dogs through which motion is imparted to the spring, the reciprocating member imparting movement through said dogs during the movement which develops the sealing pressure and thereafter passing between the dogs, and a suitable stop arresting the upward movement of the plunger so that the reciprocating member will draw out from between the dogs on its upward movement.

10. In a sealing device for capping machines, inner and outer cap compressing or forming sections of which one impinges the cap over a part of the area downward from the top, and the other impinges the cap below the same, said sections compressing inwardly the portions of the cap with which they impinge.

11. In a capping machine, inner and outer cap compressing or forming sections, of which one impinges the cap over a part of the area downward from the top, and the other impinges the cap below the same, said compressing sections being overlapped to break the joints between the sections, and compression by the inner member being developed from the outer member.

12. In a capping machine, inner and outer inwardly yielding cap-compressing or forming members constructed to respectively impinge the cap and press inwardly thereon at different distances below the top of the cap, and a reducing member coöperating with both said compressing members.

13. In a capping machine, inner and outer inwardly yielding cap-compressing or forming members, respectively impinging the areas of the cap at different distances from the top of the cap, and a reducing member coöperating with the outermost compression member to reduce it and through said outer member, reducing the member interior thereto; said cap-compressing or forming members being constructed of segments and being relatively positioned so that the segments of each member cover the joints between the segments of the other member.

14. In a capping machine, inner and outer inwardly yielding cap-compressing or forming members constructed to respectively impinge the cap and press inwardly thereon at different distances below the top of the cap, and a reducing member coöperating with both said compressing members; the inner cap-compressing or forming member being constructed to also bear upon the top of the cap.

15. In a capping machine, inner and outer inwardly yielding cap-compressing or forming members constructed to respectively impinge the cap and press inwardly thereon at different distances below the top of the cap, and a reducing member coöperating with both said compressing members; said reducing member being constructed with a plurality of independently resilient segments through which it presses the cap-compressing or forming members inward.

16. In a capping machine, an inner forming member compressible in volume adapted to rest upon the cap being applied, an outer forming member supported by the inner forming member and adapted to reduce the said inner member and a reducing member surrounding the outer forming member and adapted to reduce the same.

17. In a capping machine, inner and outer forming members constructed to impinge areas of the cap at different distances below the top, and a reducing member working over the exterior forming member and pressing said exterior and through it the interior forming member inward; said forming members being constructed of separate segments and the exterior forming member being constructed to engage above and below the interior forming member so as to confine the latter against axial displacement.

18. In a capping machine, inner and outer forming members constructed to impinge areas of the cap at different distances below the top, and a reducing member working over the exterior forming member and pressing said exterior and through it the interior forming member inward; said forming members being constructed of separate segments and the exterior forming member being constructed to engage above and below the interior forming member so as to confine the latter against axial displacement; means being provided to support the forming members upon the reducing member with limited relative axial movement between said members.

19. In a capping machine, inner and outer forming members constructed to impinge areas of the cap at different distances below the top, and a reducing member working over the exterior forming member and pressing said exterior and through it the interior forming member inward; said forming members being constructed of separate segments and the exterior forming member being constructed to engage above and below the interior forming member so as to confine the latter against axial displacement; and being also constructed with inclined outer faces for the impingement of the reducing member.

20. In a capping machine, the combination of the supporting body having a downwardly presented circumferential series of individually resilient parts, providing a reducing member, a circumferentially disposed series of segments supported within the reducing member, each constructed with an inclined face for the impingement of the resilient parts of the reducing member, with a lower supporting shoulder, and with a compressing face for contact with the cap, and an inner segmental cap compressing or forming section, the parts of which are supported by the shoulders of the outer compressing member.

21. In a capping machine, the combination of the reducing member constructed with the downwardly presented pressing fingers, the segmental outer cap compressing or forming member, constructed with the inclined lower outer faces, the inturned upper ends, the inwardly presented lower shoulders, and the inwardly presented compression faces, and supported by its upper inturned ends within the reducing member with limited axial movement therein, the inner segmental cap-compressing or forming member confined between the shoulders of the outer cap-compressing or forming and the upper inturned ends thereof, and having compression faces presented inwardly above the compression faces of the outer cap-compressing or forming member and the spring located between the upper ends of the outer cap-compressing or forming member and the opposed face of the reducing member.

22. In a capping machine, the combination of the segmental forming member having a cap-receiving cavity and the pad removably mounted in the upper end of said cavity.

23. In a capping machine, a segmental forming member constructed with a cap-receiving cavity and inturned centrally separated lower ends forming the base of said cavity, and the cap-plate fitted to the base of the cavity, having a shank projecting into the central space between the inturned ends, and an enlargement securing the shank against accidental withdrawal.

The foregoing specification signed at Washington, D. C. this 18th day of November, 1907.

JOHN ARMSTRONG McANULTY.

In presence of two witnesses:
HERVEY S. KNIGHT,
EDWIN S. CLARKSON.